United States Patent

Agarrat

[11] Patent Number: 5,799,547
[45] Date of Patent: Sep. 1, 1998

[54] OIL DISTRIBUTION IN A COMBUSTION ENGINE CRANK SHAFT

[76] Inventor: Stanley A. Agarrat, 3660 NW. 17th St., Fort Lauderdale, Fla. 33311

[21] Appl. No.: 631,840

[22] Filed: Apr. 10, 1996

[51] Int. Cl.$^6$ .................................................. F16C 3/04
[52] U.S. Cl. ........................................ 74/605; 74/597
[58] Field of Search ..................... 74/595–605; 184/6, 184/6.5

[56] References Cited

U.S. PATENT DOCUMENTS

| | | | |
|---|---|---|---|
| 1,267,526 | 5/1918 | Fawick | 74/605 |
| 1,348,664 | 8/1920 | Richard | 74/605 |
| 1,368,627 | 2/1921 | Harper | 74/605 |
| 1,555,279 | 9/1925 | Duesenberg | 74/605 |
| 2,131,170 | 9/1938 | Evans | 74/605 |
| 2,440,812 | 5/1948 | Simpson | 74/605 |
| 2,844,305 | 7/1958 | Becht et al. | 74/605 |
| 2,894,414 | 7/1959 | Johnson | 74/605 |
| 2,917,946 | 12/1959 | Fritz | 74/605 X |
| 3,768,335 | 10/1973 | Mayer | 74/597 |
| 4,969,430 | 11/1990 | Masuda | 184/6.5 X |
| 5,163,341 | 11/1992 | Murrish et al. | 184/6.5 X |

FOREIGN PATENT DOCUMENTS

| | | | |
|---|---|---|---|
| 527588 | 5/1955 | Italy | 74/605 |
| 62-93412 | 4/1987 | Japan | 74/605 |

Primary Examiner—Vinh T. Luong
Attorney, Agent, or Firm—Malin, Haley, DiMaggio &Crosby,P.A.

[57] ABSTRACT

An oil distribution system for distributing motor oil under pressure to crank shaft rod journals continuously, comprising first and second oil distribution passages disposed 180 degrees out, drilled angularly and connected together, connecting said main journals of said crank shaft to adjacent rod journals for supplying oil under pressure continuously, distributed through the main bearings, resulting in extended bearing and crank shaft life and improved fuel efficiency.

3 Claims, 2 Drawing Sheets

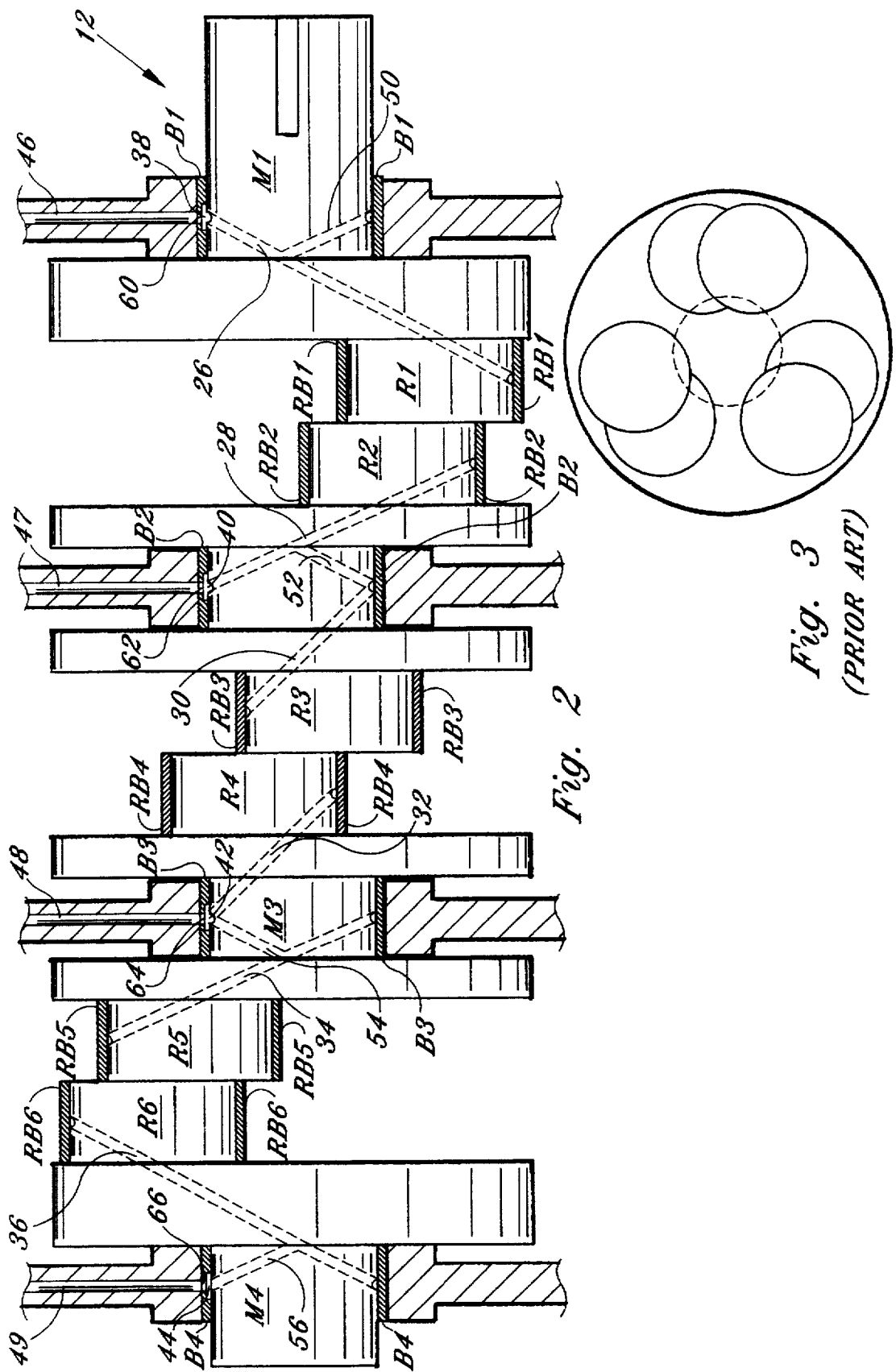

OIL DISTRIBUTION IN A COMBUSTION ENGINE CRANK SHAFT

BACKGROUND OF THE INVENTION

1. Field of the Invention

This invention relates generally to oil supply systems for internal combustion engines and in particular, to an improved oil distribution and supply system through the crank shaft to the, main bearings and rod bearings in an internal combustion engine.

2. Description of the Prior Art

Supplying oil to bearings in a crank shaft in a modern internal combustion engine is critical to the performance of the engine and the longevity of the parts of the engine. In particular, modern day V-6 engines have had some problems with the oil supply. Typically, in a V-6 internal combustion engine such as the type sold by General Motors Corporation and placed in BUICK vehicles, the main bearings on the crank shaft have half grooves disposed partially around the crank shaft which are supplied with oil under pressure from an oil pump. The result is a pulsating oil supply to the rod bearings because of the rotation of the crank shaft which has internal passageways which pass through the groove areas in the bearing to be replenished only during 180 degrees of the rotation of the crank shaft. The end result is that a continuous supply of oil is not provided to the rod bearings during each crankshaft rotation. It is not uncommon that the rod bearings fail in these engines.

The purpose of the present invention is to provide an improved oil distribution system in a crank shaft for a V-6 engine or any other engine that provides for a continuous supply of oil to the rod bearings and enhances the lubrication at the thrust bearing and eliminates the pulsating effect of the oil distribution throughout the crank shaft.

SUMMARY OF THE INVENTION

An oil distribution system for use in an internal combustion engine crank shaft for supplying oil continuously to the rod bearings disposed along the crank shaft, comprising a crank shaft useful for a V-6 engine, having six rod journals and six rod bearings attachable thereto and four main bearings attachable thereto, said crank shaft including a first oil supplying passage disposed from a peripheral position on the crank shaft main journal linearly until it reaches an outlet at the rod journal, each of said main journals having linear oil delivering passages having an opening at the main journal and an outlet at each rod journal. These first linear oil passages extending from the main journals to the rod journals are the main oil supply passages used in conventional V-6 crank shafts.

The crank shaft further includes, disposed at 180 degrees to the first passage, a second passage drilled angularly from the main journal intersecting the first passage, said first and second passage inlets being 180 degrees apart on the main journal. Each main journal includes a main bearing that has 180 degree grooved section about one portion and a non-groove section about the other portion. The inner main journals, of which there are two, include yet an additional passage from the main journal to the adjacent rod journal. These second oil passages extending from the main journals, 180 degrees out from the first oil passages, to the first oil passages are the secondary oil passages critical to the present invention.

Thus, the two outside main journals have one singular linear passage and an adjacent passage connected thereto 180 degrees out. The two inner crank shaft main journals include three passages, two of which commence from the main journal 180 degrees out from the third linear journal passage and connected thereto and to each other.

A conventional oil pump is used with the crank shaft installed. In operation, oil will flow under pressure into each of the upper main bearings and the groove in those bearings, where the oil is distributed through each rotational 180 degrees down one of the passages. In other words, an oil distribution passage opening is always present in the main bearing groove so that there will be a continuous flow of oil under pressure to the rod bearings. Oil is thus continuously distributed to the adjacent rod bearing in each case. In the case of the two inner main bearings, oil is continuously provided to both adjacent rod bearings on each side. Lubricating motor oil under pressure is forced from the pump through a small hole in the top of each main bearing, where it is distributed along 180 degrees of the bearing within the main bearing groove. Disposed 180 degrees from each other is the inlet of each oil dispersing passage, so that as it passes through the groove portion of the main bearing, the oil under pressure is forced into the inlet opening along the passage, terminating in the adjacent rod journal and rod bearing. Thus, it can be seen that oil is always under pressure to each of the rod bearings, insuring that they are not prematurely damaged from oil starvation. It is the objective of this invention to provide an improved oil distribution system for a crank shaft constructed from lightweight, relatively inexpensive materials such as cast iron, and especially to provide continuous oil flow to rod journals and bearings.

It is another objective of this invention to provide an after-market correction on V-6 engines to improve the oil distribution of the engine by modifying the crank shaft with additional oil distribution passages.

And yet still another objective of this invention is to provide an improved V-6 engine with improved performance through modifications without reduced oil pressure to the oil distribution system.

Another objective of the invention is to distribute as much oil as possible to the lower half of the engine.

In accordance with these and other objectives which will become apparent hereinafter, the instant invention will now be described with particular reference to the accompanying drawings.

BRIEF DESCRIPTION OF THE DRAWINGS

FIG. 2 shows a side elevational view, partially in cross section, of a V-6 crank shaft and oil distribution system in accordance with the present invention.

FIG. 3 shows a front elevational view, schematically representing a conventional V-6 crank shaft.

DESCRIPTION OF THE PREFERRED EMBODIMENTS

Figure 1:
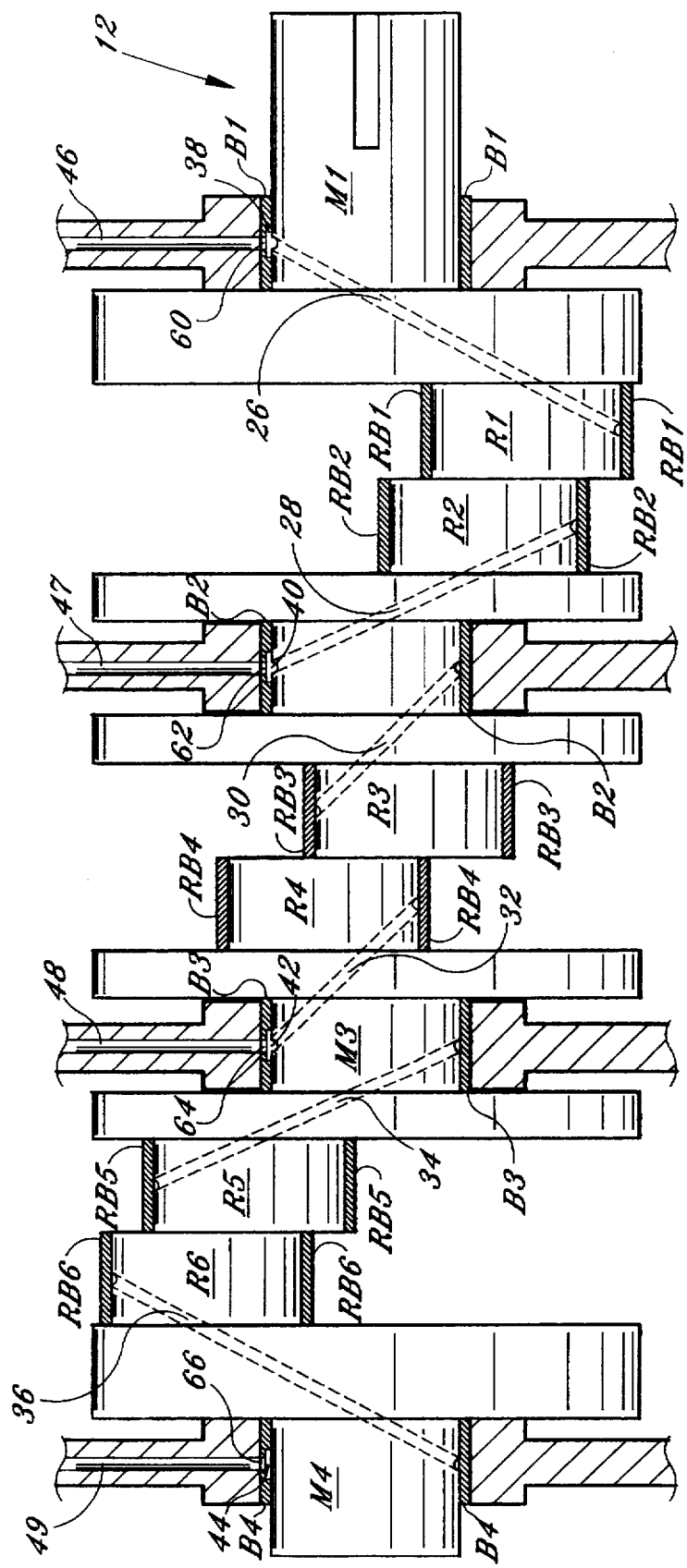
FIG. 1 shows a prior art side elevational view of a V-6 crank shaft partially in cross section, showing the previous oil distribution system.

Referring now to the drawings and in particular FIG. 1, a conventional V-6 engine crank shaft, of the type sold by General Motors Corporation for its BUICK vehicles, is shown at 12 in a side elevational view, partially schematic. The dotted passages 26, 28, 30, 32, 34, and 36 represent straight-line, cylindrical, bored-out passageways that transmit oil from the upper main bearings B1, B2, B3, and B4, through main journals M1, M2, M3, and M4 and through rod journals R1, R2, R3, R4, R5, and R6, to adjacent rod bearings RB1, RB2, RB3, RB4, RB5, and RB6. Each upper main bearing B1, B2, B3, and B4 includes, respectively, a 180 degree groove 38, 40, 42, and 44 that have apertures 60, 62, 64, and 66 disposed therein which receive oil under pressure from the engine oil pump (not shown) through oil passages 46, 47, 48, and 49. Thus, within each groove 38, 40, 42, and 44 is oil under pressure as the crank shaft 12 rotates. Note that each first, or main, oil passage, such as 26, has an inlet that opens into upper main bearing B1 groove 38 for 180 degree traverse of the rotating crank shaft 12. During that time, oil under pressure goes down passage 26, through main journal M1 and through rod journal R1, to where it exits at journal R1 onto rod bearing RB1. Note that oil will only be able to flow under pressure during the 180 degree segment where the opening to passageway 26 is within the groove 38 for 180 degree rotation of the crank shaft. When the opening to passage 26 is adjacent the nongroove portion of bearing B1, no oil is flowing and rod journal R1 does not get oil under pressure. Thus, it can be seen with each of the upper main bearings B1, B2, B3, B4, which function the same way, oil is pulsating for 180 degree segment. The end result is that there is not a continuous distribution of oil to the rod bearings RB1, RB2, RB3, RB4, RB5, and RB6, which can result in failure of the rod journals R1, R2, R3, R4, R5, and R6, then the crank shaft and engine.

The present invention is shown in FIG. 2 with a solution that provides for continuous oil flow under pressure to the rod journals and rod bearings. With respect to main journal M1, there is an additional angular secondary oil passage 50 which is 180 degrees out at its opening from passage 26 and intersecting with passage 26. Therefore, oil under pressure in the main bearing groove 38 will be flowing under pressure either into passage 26 or passage 50, whichever has its opening disposed in the bearing groove 38. This insures that oil under pressure will always arrive at rod journal R1 and be constantly supplied to rod bearing RB1.

With respect to the main journal M2, additional angular secondary oil passage 52 in conjunction with first or main passage 28 provides for continuous oil flow under pressure to rod journals R2 and R3, and thus rod bearings RB2 and RB3, commencing either from passage 28 or passage 52.

With respect to main journal M3, additional angular passage 54 in conjunction with passage 34 provides for continuous oil flow under pressure to rod journals R4 and R5 and thus rod bearings RB4 and RB5 commencing either from passage 34 or passage 54.

Finally, with respect to main journal M4, additional angular passage 56 in conjunction with passage 36 provides for continuous oil flow under pressure to rod journal R6 and thus rod bearing RB6 commencing either from passage 36 or passage 56.

FIG. 2 also shows oil passages 46, 47, 48, and 49 that supply oil under pressure from the engine oil pump (not shown) to main bearings B1, B2, B3, and B4, respectively, through apertures 60, 62, 64, and 66 into grooves 38, 40, 42, and 44, respectively.

Note from the construction of the additional oil passages in FIG. 2, which are disposed angularly 180 degrees out from the conventional passage, that this work could be done in an after-market product with the crank shaft removed from a conventional V-6 engine and the additional oil passages drilled or bored into the crank shaft.

FIG. 3 shows the conventional spacing of the rod bearings around the crank shaft in a conventional Buick V-6 engine.

Utilizing the present invention, which is a fairly non-complex modification, the overall engine efficiency can be greatly improved and potential future damages to these engines alleviated and the engine life greatly increased with such modifications.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An oil supply system for an internal combustion engine crank shaft, comprising:

a plurality of main journals and a plurality of rod journals, at least one each of said plurality of rod journals adjacent one each of said plurality of main journals;

a plurality of first passageways one each connected between one each of said plurality of main journals and one each of said adjacent rod journals for distributing oil under pressure between said main journals and said rod journals;

a plurality of main bearings, one each mounted circumferentially around one each of said plurality of main journals, each of said plurality of main bearings having a grooved portion disposed on an inner surface and extending approximately 180 degrees around each of said plurality of main journals;

a plurality of rod bearings one each mounted circumferentially on one each of said plurality of rod journals;

a plurality of second passageways one each connected between one each of said plurality of main journals and one each of said plurality of first passageways, each of said plurality of main journals having one each of said plurality of first passageways and one each of said plurality of second passageways being disposed directly adjacent one each of said circumferentially mounted main bearings and approximately 180 degrees apart from each other, wherein oil is suppliable continuously to all of said rod journals and rod bearings through said plurality of first and said plurality of second passageways.

2. An oil supply system as in claim 1 wherein, said plurality of first and said plurality of second passageways being angularly disposed relative to a central axis of the crank shaft.

3. An oil supply system as in claim 2 wherein, each of said plurality of second passageways is in fluid communication with at least one of said plurality of first passageways to enhance oil flow to said plurality of rod bearings continuously for each crank shaft rotation.

\* \* \* \* \*